United States Patent [19]

Veaux et al.

[11] Patent Number: 5,310,140
[45] Date of Patent: May 10, 1994

[54] SHOCK ABSORBER FOR AN AIRCRAFT LANDING GEAR LEG

[75] Inventors: Jacques Veaux, Chatillon; Michel Derrien, Versailles, both of France

[73] Assignee: Messier-Bugatti, Velizy Villacoublay, France

[21] Appl. No.: 11,750

[22] Filed: Feb. 1, 1993

[30] Foreign Application Priority Data

Feb. 4, 1992 [FR] France ................................ 92 01242

[51] Int. Cl.⁵ ............................................ B64C 25/10
[52] U.S. Cl. ........................... 244/104 FP; 267/64.16
[58] Field of Search ......... 244/104 R, 104 FP, 100 R, 244/102 R, 102 SS; 267/64.16, 64.17; 180/89.14

[56] References Cited

U.S. PATENT DOCUMENTS

| | | |
|---|---|---|
| 2,735,634 | 2/1956 | Fosness . |
| 2,933,271 | 4/1960 | Maltby . |
| 3,826,450 | 7/1974 | Currey . |
| 3,954,232 | 5/1976 | Harper . |

*Primary Examiner*—Galen L. Barefoot
*Attorney, Agent, or Firm*—Sixbey, Friedman, Leedom & Ferguson

[57] ABSTRACT

The invention relates to a shock absorber for a landing gear leg, the shock absorber being of the type comprising a cylinder and a sliding rod, and including a disk that delimits a lower hydraulic fluid chamber which communicates via a diaphragm with an upper hydraulic fluid chamber adjacent to a pressurized gas chamber formed in the top portion of the cylinder. According to the invention, the sliding rod 102 is implemented in telescopic form, having an outer rod 131 and an inner rod 132 which bears directly against an intermediate partition 112 constituting the above-mentioned disk when the shock absorber is relaxed or under static load. The shock absorber also includes a linear actuator 150.1 received in the inner rod 132, and which, when triggered, serves to extend the landing gear providing the airplane is stationary or is moving slowly on the ground. Two scissors linkages 124 and 127 are also provided for conveying structural twisting forces.

12 Claims, 5 Drawing Sheets

FIG_4

SHOCK ABSORBER FOR AN AIRCRAFT LANDING GEAR LEG

The invention relates to shock absorbers for aircraft landing gear legs, and in particular for retractable landing gear for an airplane.

BACKGROUND OF THE INVENTION

It is known that a shock absorber for an airplane landing gear leg can be implemented in the form of a cylinder and a rod that slides inside said cylinder, said rod including a bottom that delimits a lower hydraulic fluid chamber which communicates via a diaphragm with an upper hydraulic fluid chamber adjacent to a chamber containing gas under pressure and formed in the top portion of the cylinder.

In certain situations, when the airplane is stationary or moving slowly over the ground, it is desirable to be able to modify the attitude of the airplane, i.e. the inclination of its longitudinal axis.

One possible approach then consists in attempting to change the length of its nose landing gear without altering its main landing gear: if the nose landing gear can be lengthened, then the attitude desired for an airplane which is stationary or which is moving slowly on the ground can be achieved.

Under such circumstances, it is advantageous to have nose landing gear capable of being lengthened.

Nevertheless, it is necessary to avoid confusing lengthening the landing gear while the airplane is stationary or moving slowly on the ground, and lengthening the landing gear so as to enable it to run over rough ground and even to pass over obstacles that are large in size. In the latter circumstance, the idea is to change the isothermal response curve of the shock absorber (variation in shock absorber force as a function of retraction stroke), e.g. by providing a structure such that the shock absorber has a single chamber on landing, and two chambers when taxiing (after the landing gear has been lengthened), as described in the document FR-A-2 601 097.

The shock absorber described in that document thus includes a moving disk that delimits the top of a high-pressure gas chamber whose bottom is delimited by a piston whose rod passes through the moving disk, and a bottom hydraulic fluid chamber which is delimited by said piston and by the end of the sliding rod, and which is fed from a controllable source connected to the hydraulic power generator of the airplane. The structure of that shock absorber provides the desired objective, i.e. it passes freely over bumps, and as a result, such a shock absorber is unsuitable for the sole purpose of statically lengthening the landing gear when the airplane is stationary or moving slowly on the ground.

Static lengthening of the landing gear for an airplane that is stationary or that is moving slowly on the ground, consists merely in generating a force equivalent to the static load on the landing gear so as to raise the cylinder of the shock absorber relative to its sliding rod (which rod is stationary, such that lengthening the shock absorber by moving out its sliding rod causes the cylinder or cylinder portion of said shock absorber to be raised).

OBJECTS AND SUMMARY OF THE INVENTION

An object of the invention is to solve this technical problem by designing a shock absorber whose structure makes it easy to lengthen the landing gear when the airplane is stationary or moving slowly on the ground, without requiring the hydraulic generator of the airplane to be used, i.e. without requiring its engines to be running.

Another object of the invention is to provide a shock absorber that is simple in design, and for which such lengthening is easily obtained without any risk of disturbance to or leakage from the circuits of the airplane's hydraulic generator circuits.

More particularly, the present invention provides a shock absorber for an aircraft landing gear leg, the shock absorber comprising a cylinder and a rod sliding in said cylinder, together with a disk defining a lower hydraulic fluid chamber which communicates via a diaphragm with an upper hydraulic fluid chamber adjacent to a pressurized gas chamber provided in the upper portion of the cylinder, wherein the sliding rod is implemented in telescopic form, having an outer rod sliding in the cylinder, an intermediate partition which constitutes the above-mentioned disk, and an inner rod sliding in the outer rod on the other side of said partition from the lower hydraulic fluid chamber, bearing directly against said partition when the shock absorber is relaxed or under static load, and wherein the shock absorber further includes a linear actuator received inside the inner rod and suitable, when switched on, for extending the landing gear while the airplane is stationary or moving slowly on the ground, and at least one external scissors linkage for conveying the structural twisting forces to which the telescopic sliding rod is subjected.

Advantageously, the shock absorber includes independent means for controlling the linear actuator, said independent means being integrated, at least in part, inside the inner rod.

Independent control of such a self-contained linear actuator thus makes it possible to raise the landing gear without it being essential to use the hydraulic power generator of the airplane.

In a particular embodiment, the shock absorber includes two scissors linkages for conveying the structural twisting forces, comprising a lower linkage connecting the inner rod to the outer rod, and an upper linkage connecting the outer rod to a sleeve rotatably mounted on the cylinder.

In a variant, the shock absorber includes a single scissors linkage connecting the inner rod to a sleeve rotatably mounted on the cylinder, together with additional anti-rotation means between the inner rod and the outer rod.

It is then preferable for the additional anti-rotation means to be integrated, at least in part, inside the outer rod.

In a first type of shock absorber in accordance with the invention, the linear actuator is an electro-mechanical actuator having a screw and nut system in which the screw is prevented from moving axially and in which the nut is secured to the intermediate partition.

It is then advantageous for the nut of the screw and nut system to be mounted at the end of a central sleeve secured to the intermediate partition, into which the screw of said screw and nut system penetrates, said nut moving in an upper chamber of the inner rod and co-operating with an internal projection of said inner rod to form an abutment in the maximally extended position, the inner rod also having a lower chamber in which a driving motor and gear box assembly is received, at least in part. In particular, the additional anti-rotation means is constituted by a stud sliding in an associated axial slot, said stud being preferably secured to the nut and penetrating into an axial slot formed in the wall of the inner rod.

In another type of shock absorber in accordance with the invention, the linear actuator is a hydraulic actuator whose rod is secured to the intermediate partition and slides in an upper chamber of the inner rod, said inner rod also having a lower chamber in which an electrical pump and a pressurized supply of hydraulic fluid are provided.

It is then preferable for the inner rod to include an intermediate partition delimiting said lower and upper chambers, said partition carrying axial locking means, e.g. mechanical claw means, co-operating with the rod of the hydraulic actuator when the inner rod bears against the intermediate partition of the outer rod, i.e. when the shock absorber is relaxed or under static load.

In particular, the additional anti-rotation means includes corresponding cams of the inner rod and of the intermediate partition of the outer rod, said cams co-operating mutually when the shock absorber is relaxed or under static load. In a variant, the additional anti-rotation means includes a small scissors linkage connecting the inner rod to the outer rod.

BRIEF DESCRIPTION OF THE DRAWINGS

Other characteristics and advantages of the invention appear more clearly in the light of the following description and the accompanying drawings which relate to particular embodiments, and in which.

MORE DETAILED DESCRIPTION

Figure 1:
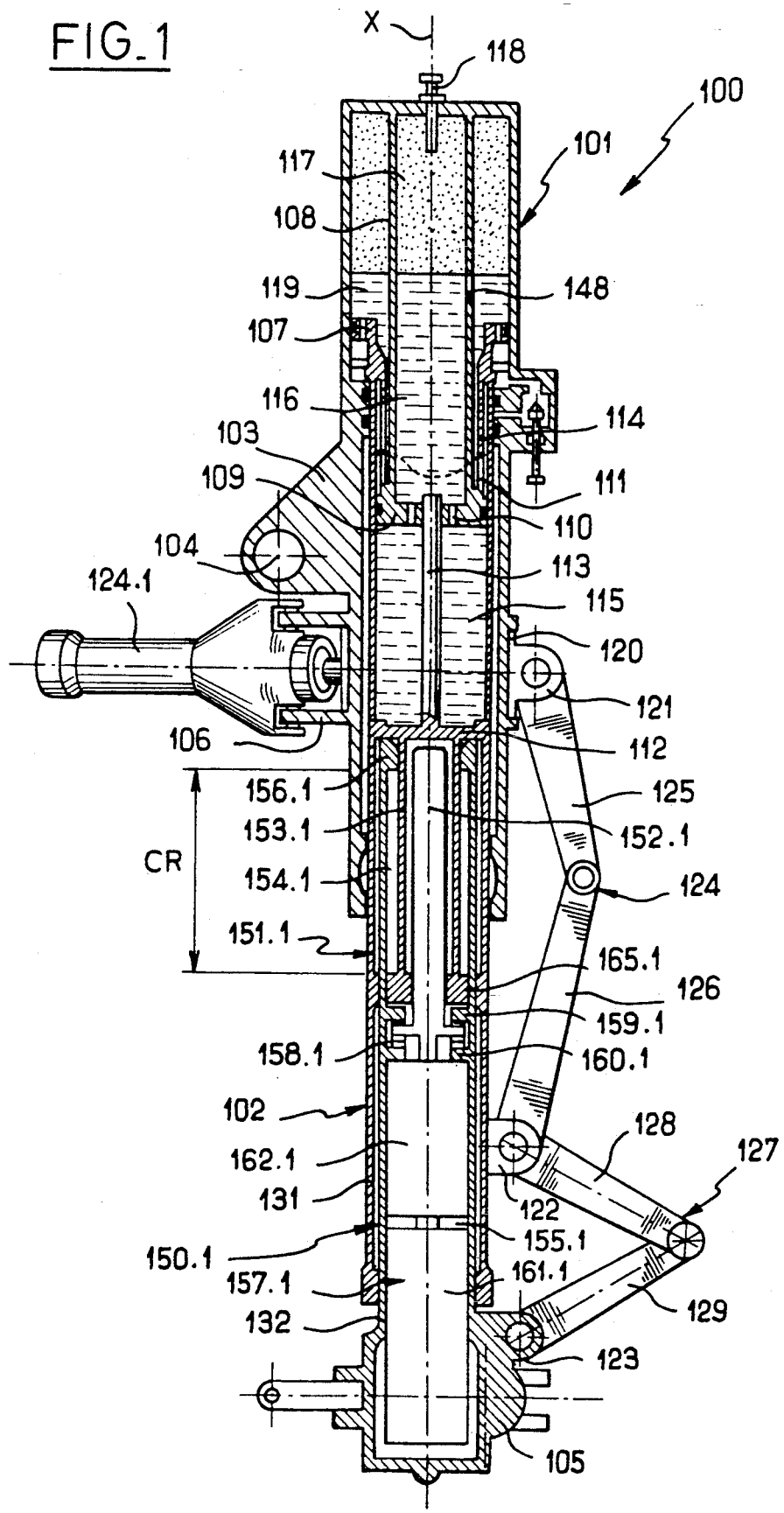
FIG. 1 is an axial section through a shock absorber of the invention having two scissors linkages for conveying structural twisting forces, and in which the linear actuator is a screw and nut system electro-mechanical actuator, whose associated driving motor and gear box assembly is, in this case, integrated within the inside rod of the telescopic sliding rod, with the position shown corresponding to the shock absorber being relaxed (i.e. under no static load) and not raised.

FIG. 1 shows a shock absorber 100 of the invention for the leg of an airplane landing gear, the shock absorber comprising a cylinder 101 and a rod 102 slidably received inside said cylinder, coaxially about its axis X. The shock absorber 100 has a certain number of members that are conventional in type, and whose structure is described briefly below.

The cylinder 101 has a hinge axis (not shown) with the structure of the airplane, and an appendix 103 corresponding to a hinge axis 104 associated with the side brace of the shock absorber, since this shock absorber is for retractable landing gear. Gusset plates 106 are hinged to two actuators 124.1 controlling the steering of the wheel set, with the rods of said actuators being connected to a rotary sleeve 120 coaxial with the cylinder 101.

In accordance with an essential aspect of the invention, the sliding rod 102 is implemented in telescopic form, i.e. it is split up into two separate components, having an outer rod 131 sliding in the cylinder 101, and an inner rod 132 sliding in the outer rod 131. The outer rod 131 includes a fixed end wall constituted by an intermediate partition 112 which delimits a lower hydraulic fluid chamber 115 that is in communication via a diaphragm with an upper hydraulic fluid chamber 116 adjacent to a chamber 117 for gas under pressure provided in the upper portion of the cylinder 101.

The upper portion of the outer rod 131, i.e. the portion that in FIG. 1 extends above the intermediate partition 112, thus extends upwards to an upper enlargement 107 which moves inside the upper portion of the cylinder 101. The cylinder 101 includes a plunging rod 108 whose bottom end 109 slides in the upper portion of the outer rod 131. In conventional manner, the plunging rod 108 has a helical cam 111 outside and above its bottom end 109, said cam co-operating with a corresponding cam 114 secured to the upper portion 107 of the outer rod 131. The cams 111 and 114 thus serve automatically to recenter and hold the respective angular positioning between the cylinder and the sliding rod, i.e., more precisely, between the cylinder and the upper portion of the outer rod of said telescopic sliding rod. In association with the fixed bottom 109 of the plunging rod 108, the intermediate partition 112 delimits a lower chamber 115 of hydraulic fluid, said bottom 109 having a rod 113 passing through the center thereof, which rod is secured to the intermediate partition 112 and has throttling orifices 110 disposed thereabout providing the diaphragm function for hydraulic shock absorption, in conventional manner. The lower chamber 115 of hydraulic fluid thus communicates via the diaphragm with an upper chamber 116 of hydraulic fluid adjacent to a chamber 117 of air under pressure, which chamber is inflated via a conventional type of valve 118. The chambers 116 and 117 thus occupy the inside of the plunging rod 108, in the top portion of the cylinder 101 of the shock absorber, and a certain volume of hydraulic fluid 119 occupies the annular chamber surrounding said plunging rod 108, because of communication orifices 148 formed through said plunging rod.

The inner rod 132 slides inside the outer rod 131, i.e. in the space situated on the other side of the intermediate partition 112 relative to the lower hydraulic fluid chamber 115. As can be seen in the figure, the upper portion of the inner rod 132 bears directly against the intermediate partition 112 when the shock absorber is relaxed. The same applies when the shock absorber is under static load, as described below.

The lower end of the inner rod 132 carries a wheel set, and in this figure there can be seen only the axis 105 associated with the corresponding stub axle. The structural twisting forces to which the telescopic sliding rod 102 is subjected are conveyed in this case by two external scissors linkages, comprising an upper scissors linkage 124 and a lower scissors linkage 125 and 126, thereby providing a connection between the outer rod 131 and the rotary sleeve 120 on the cylinder 101, with connection taking place via respective associated forks 122 and 121. The lower compass linkage 127 is made up of two hinged arms 128 and 129 and it provides a connection between the inner rod 132 and the outer rod 131 via respective associated forks 123 and 122. In this case, it should be observed that the fork 122 is common to both scissors linkages. However, that merely constitutes one particular embodiment, and it would be possible to use two separate forks.

The shock absorber 100 also includes a linear actuator 150.1 which, in this case, is totally integrated inside the inner rod 132 of the telescopic sliding rod 102. In this case, the linear actuator 150.1 is constituted by an electro-mechanical actuator based on a screw and nut system 151.1, with its screw 152.1 being prevented from moving axially and with its nut 165.1 being secured to the intermediate partition 112 of the outer rod 131.

The intermediate partition 112 is downwardly extended by a central sleeve 153.1 into which the screw 152.1 of the screw and nut system penetrates, said central sleeve carrying the nut 165.1 of said system. The inner rod 132 extends upwards, around the screw of the screw and nut system, and as far as end projections 156.1. The nut 165.1 thus moves in an upper chamber 154.1 of the inner rod 132, and it co-operates with the internal projections 156.1 of said inner rod to form an abutment in the position of maximum extension, the extension stroke being referenced CR. In the relaxed position, as shown in FIG. 1, the inner rod bears directly via its internal projections 156.1 against the end 112 of the outer rod 131. When the leg shock absorber is under static load, the two components 131 and 132 of the telescopic sliding rod move together like a one-piece structure into the cylinder of the shock absorber, i.e. the inner rod 132 continues to bear against the partition 112 of the outer rod 131. As a result, the upper scissors linkage 124 takes up a different disposition under static load, whereas the lower linkage 127 retains the same disposition. When the linear actuator 151.1 is engaged, rotation of the screw 152.1 that is prevented from moving axially causes the nut 165.1 to be displaced, thereby moving the two components of the telescopic sliding rod 102 apart, thus enabling the landing gear to be extended while the airplane is stationary or is moving slowly on the ground.

As will easily be understood, it is possible to obtain a large extension stroke CR, and in particular it is possible to obtain a stroke that exceeds the retraction stroke of the sliding rod under a static load. It should also be observed that the top end of the screw in the screw and nut system is not in contact with the intermediate partition 112 of the outer rod 131 when the shock absorber is relaxed or under static load, i.e. when the inner rod 132 has its internal projections 156.1 beating against said intermediate partition 112. This prevents vertical forces being transmitted to the screw and nut system, which system is concerned by vertical forces only while the landing gear is being lengthened.

Axial abutments 158.1 disposed between associated shoulders 159.1 and 160.1 of the inner rod 132 are provided for conveying the axial forces to which the screw and nut system 151.1 is subjected. Beneath these axial abutments which are preferably constituted by rollers, the inner rod 132 includes a lower chamber 155.1 in which a driving motor and gear box assembly 157.1 is received, in this case entirely. The motor and gear box assembly thus comprises an electric motor 161.1 and a gear box 162.1, which may be constituted by a two-stage epicyclic gear box, for example, with the screw of the screw and nut system being mounted at the outlet thereof (which screw may be a ball screw or a roller screw). In this case, independent control means are integrated entirely inside the inner rod 132: in a variant, it would nevertheless be possible to dispose the electric motor, and possibly also the associated gear box, outside the inner rod 132 so as to facilitate possible ground maintenance of said means. Actuating the electric motor 161.1 thus causes the ball screw 152.1 to rotate, thereby telescopically lengthening the sliding rod 102 so as to obtain the desired extension of the landing gear. Shortening of the landing gear can be obtained merely by driving the motor in the reverse direction, thereby returning the shock absorber to the initial position it used to occupy under static load before it was extended. The extended position is preferably secured by a brake (not shown) that is activated by switching off the power supply to the motor, and that is in installed at the outlet from the motor. If the screw and nut system is irreversible, then the high position is maintained by said irreversibility.

Figure 2:
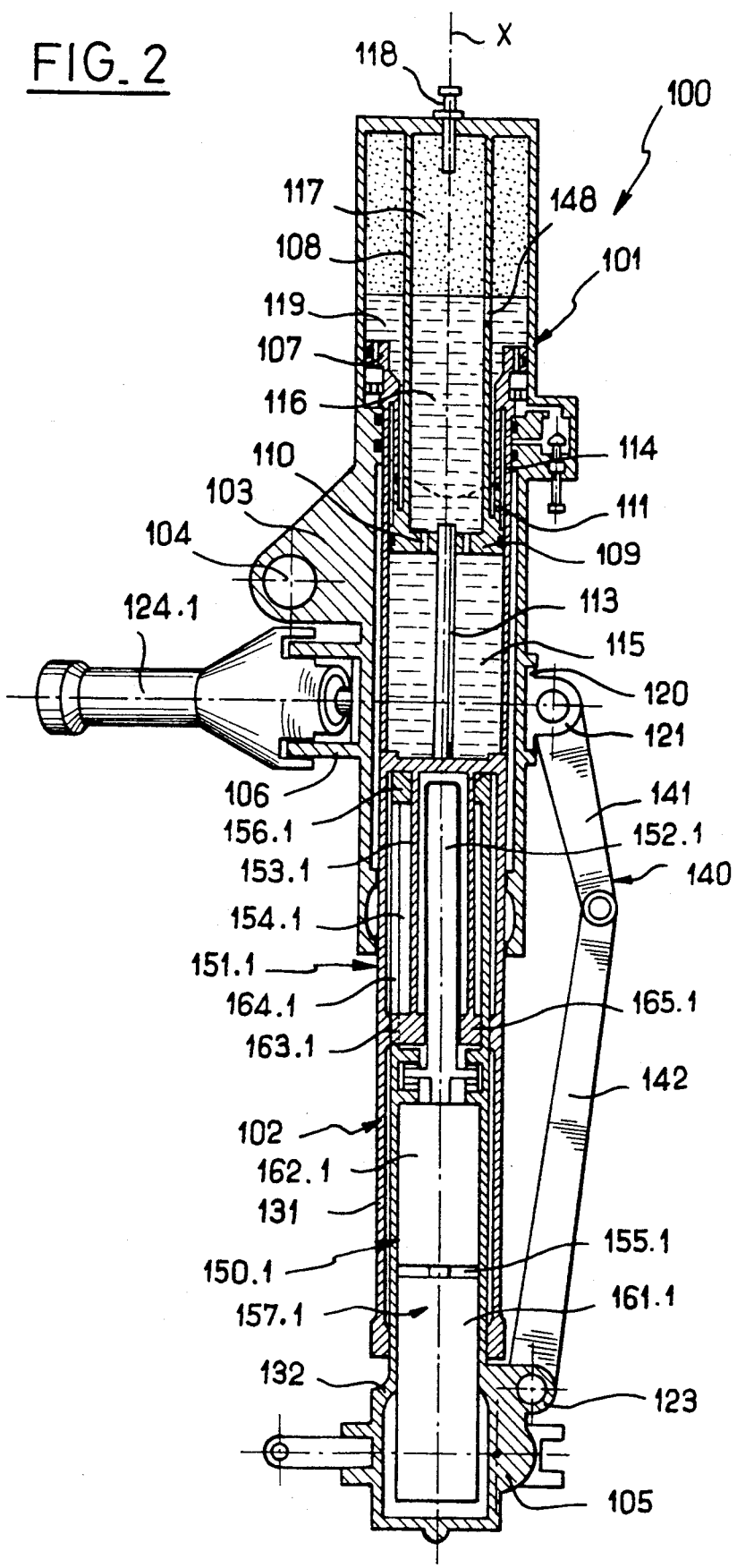
FIG. 2 shows a variant of the preceding shock absorber having a single scissors linkage for conveying structural twisting forces, together with additional anti-rotation means having a stud and an axial slot.

The disposition of the two scissors linkages 124 and 27 serves both to transmit twisting forces for control purposes and due to ground forces, and also to prevent rotation between the two components of the telescopic sliding rod 102. It is nevertheless possible, in a variant, to provide a system having a single scissors linkage for conveying structural twisting forces. One such variant is shown in FIG. 2.

The shock absorber 100 shown in FIG. 2 has numerous components that are identical to those of the shock absorber described above: for convenience, these components are given the same references and they are not described again below. The shock absorber 100 differs from the previously described embodiment by having a single scissors linkage system 140 which is constituted by two hinged arms 141 and 142 that connect the inner rod 32 to the rotary sleeve 120 via the associated forks 123 and 121.

It is then necessary to provide additional anti-rotation means between the inner rod 132 and the outer rod 131. In this case, the means shown in FIG. 2 is constituted by a stud 163.1 secured to the nut 165.1 of the screw and nut system, and by an associated axial slot 64.1 provided in the wall of the inner rod 132. As a result, relative angular positioning of the two components of the telescopic sliding rod is guaranteed by the relative displacements between the projecting stud and the axial slot in which it is received, and this applies regardless of the relative position between the inner and outer rods. In a variant, it would naturally be possible to provide for a part to be disposed inside the inner rod 132, said part having an axial slot in which a stud moves that is secured in line with the nut carrier 153.1. Such an embodiment would make it possible to avoid forming a slot in a structural part that is subjected to bending, particularly when the landing gear is in its extended position. It should be observed that the only return moments on the axis are due, in fact, to those generated by the angular locking cams 111 and 114, with twisting forces during landing being conveyed by the sole scissors linkage 140. It is naturally appropriate to provide a single linkage that is long enough for allowing an adequate lengthening stroke to be obtained.

As will readily be understood, the use of a self-contained linear actuator with independent control means makes it possible to obtain complete separation of functions, and enables this to be obtained without any need to provide a moving gasket. This applies to the shock absorbers described above with reference to FIGS. 1 and 2. The above-described type of shock absorber can easily be implemented so as to obtain landing gear that can be extended by about 400 mm.

Figure 3:
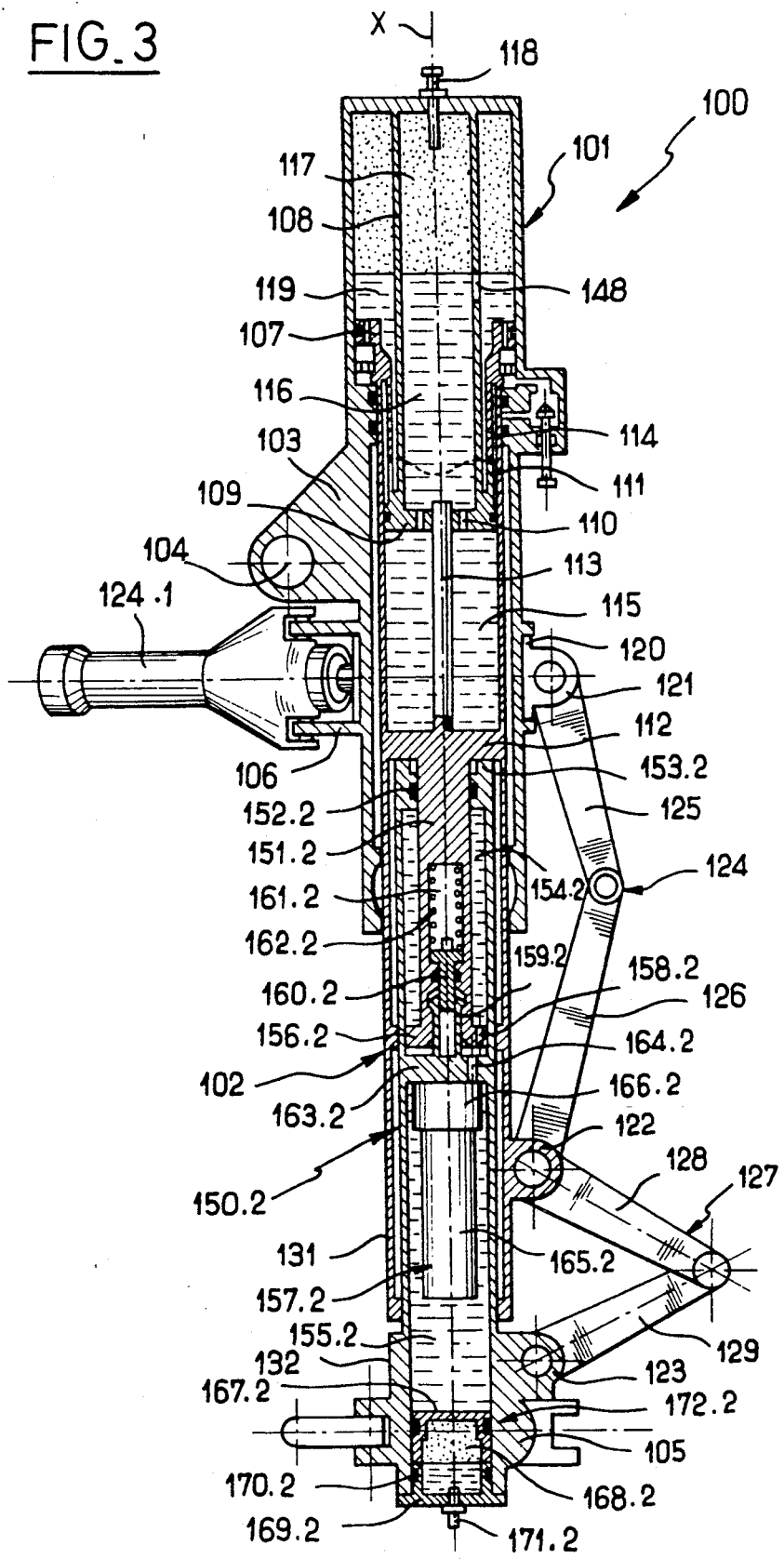
FIG. 3 is an axial section through another type of shock absorber of the invention, having two scissors linkages for conveying structural twisting forces and in which the linear actuator is a hydraulic actuator, whose driving electrical pump is integrated, in this case, within the inside rod of the telescopic sliding rod, the position shown again corresponding to the shock absorber being relaxed (i.e. under no static load), and not raised.

It is naturally possible to provide for other types of linear actuator to be used for performing the extension function, providing the actuator is self-contained. FIG. 3 shows another shock absorber of the invention in which the linear actuator is no longer an electromechanical screw and nut type actuator, but is an electro-hydraulic actuator of the type including a hydraulic actuator.

Like the shock absorber described above with reference to FIG. 1, the shock absorber 100 shown in FIG. 3 includes, a system for conveying structural twisting forces by means of two scissors linkages. The principle thereof is therefore not described again. The shock absorber 100 shown in FIG. 3 differs from that shown in FIG. 1 by the bottom portion of its outer rod 131, and by the way in which the inside of the inner rod 132 is organized.

The bottom portion of the outer rod 131 is modified so as to have a central rod 151.2 that extends from the partition 112 all the way to an intermediate disk 156.2 which has the top portion of the inner rod 132 passing therethrough. This central rod 151.2 constitutes the rod of the hydraulic actuator 150.2, and it slides inside the upper chamber 154.2 of the inner rod 132 which is delimited at its top end by a partition 163.2 of the inner rod 132. The top partition of the rod 132 slides in sealed manner (gasket 152.2) over the central rod 151.2. The inner rod 132 is finally terminated by a top end 153.2 which bears directly against the partition 112 when the shock absorber is relaxed or under static load.

In addition, the inner rod 132 has a lower chamber 155.2 beneath its intermediate partition 163.2, which chamber contains an electrical pump 165.2 and its associated electrically controlled valve block 166.2, together with a pressurized supply 172.2 of hydraulic fluid. The assembly 157.2 constituted by the electrical pump and its associated electrically controlled valve block thus constitutes independent control means for the electrohydraulic actuator 150.2. When switched on, the electrical pump 165.2 feeds hydraulic fluid into the upper chamber 154.2 via an associated channel 164.2, which fluid is at equal pressures on either side of the intermediate partition 156.2, because of associated holes 158.2 formed through said partition. The pressurized supply 172.2 is of conventional type and includes a piston 167.2 delimiting the bottom of the hydraulic fluid chamber 155.2, with a chamber 168.2 of gas under pressure being found under said piston and directly adjacent to a volume 170.2 of hydraulic fluid so as to provide a pressurized supply that avoids any danger of cavitation in the hydraulic pump 165.2. The pressurized supply can easily be filled through the bottom 169.2 of the inner rod 131 by means of a conventional type valve 171.2.

Axial locking means are also provided between the two components of the telescopic sliding rod 102 when the inner rod 132 bears against the intermediate partition 112 of the outer rod 131, i.e. when the shock absorber is relaxed or under static load. The axial locking means shown is constituted by claw type mechanical means, where claws 159.2 can be seen, which claws are held in the locked position by a locking plunger piston 160.2 that slides in an associated inner housing 161.2 of the central rod 151.2, said plunger piston being urged towards the locking position by an associated spring 162.2. When the electrical pump is switched on, the hydraulic fluid causes the plunger piston 160.2 to be retracted into its housing 161.2, thereby releasing the locking of the claws, and thus allowing the sliding rod to extend telescopically. This provides safety locking for the purpose of avoiding the inner rod 132 sliding relative to the outer rod 131 in the event of leakage. It should be observed that the locking system is not subjected to large vertical forces insofar as the inner rod continues to bear against the intermediate partition 112 when the shock absorber is relaxed or under static load.

When the shock absorber is under static load, the two components 131 and 132 of the sliding rod 102 move up as a single part inside the cylinder of the shock absorber, and the upper scissors linkage 124 deforms accordingly, while the lower linkage 127 remains in the same position. When it is desired to extend the landing gear, the electrical pump 165.2 is switched on, thereby causing the two components of the telescopic sliding rod to be extended, as for the shock absorber described above with reference to FIG. 1.

Figure 4:
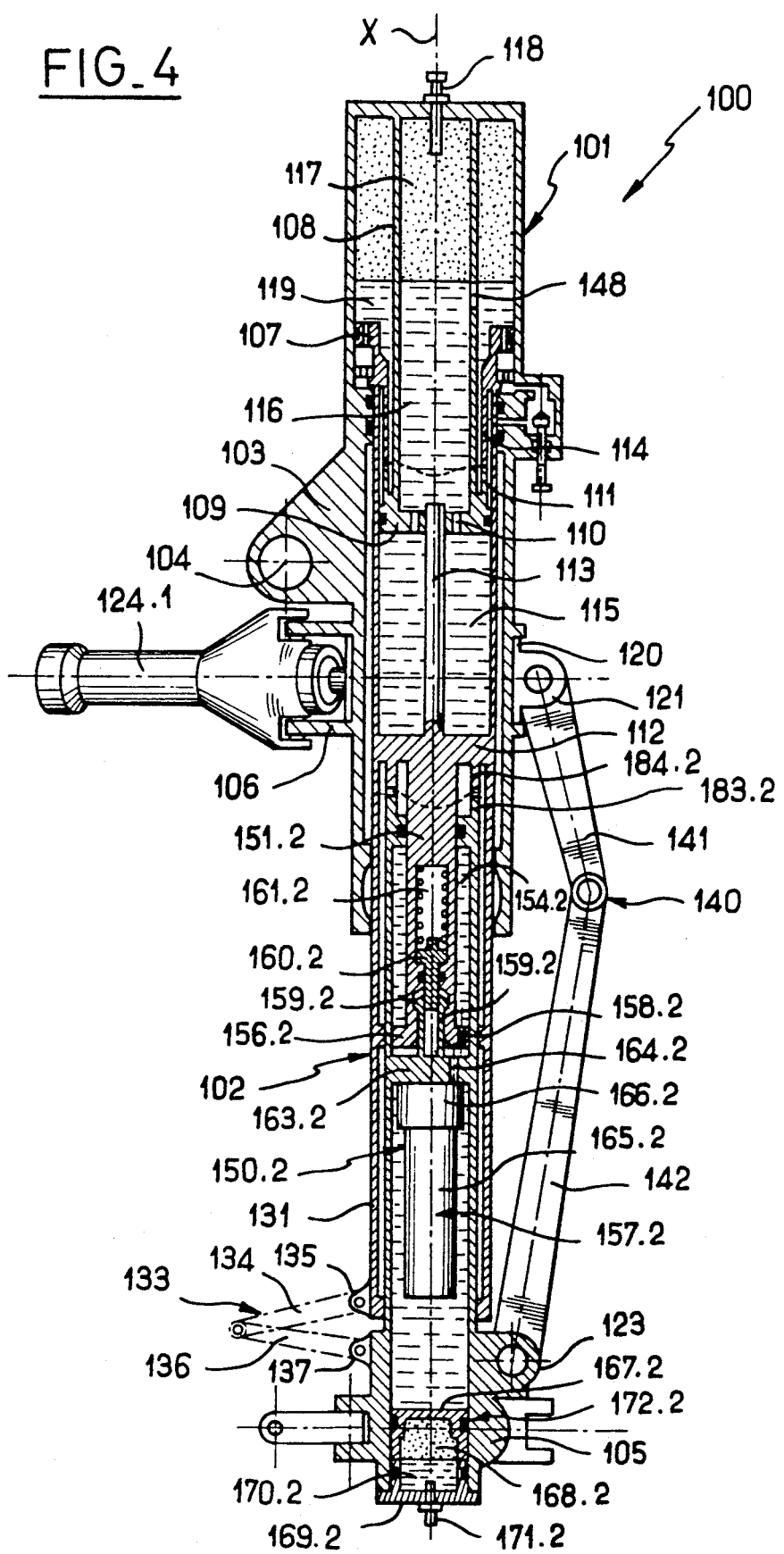
FIG. 4 shows a variant of the above shock absorber having a single scissors linkage for conveying structural twisting forces, and having additional anti-rotation means provided by complementary cams, optionally replaced by a small scissors linkage connecting together the two components of the telescopic sliding rod.

FIG. 4 shows a variant of the above-described shock absorber in which the system for conveying structural twisting forces is provided by a single scissors linkage 140, like for the shock absorber described above with reference to FIG. 2. This shock absorber differs from the preceding shock absorber by said force-conveying linkage system, and also by the presence of additional anti-rotation means. This anti-rotation function between the two components of the telescopic sliding rod is provided, as shown, by a system having cams 183.2 and 184.2, which corresponding cams are helical in shape and are disposed in the same manner as the cams provided at the top of the outer rod 132 and on the central extension of the shock absorber cylinder. Unlike the stud and axial slot system described above with reference to FIG. 2, the corresponding cam system shown herein has effect only in the "retracted" position of the telescopically sliding rod, i.e. only when the shock absorber is relaxed or under static load. In the extended position, the corresponding cams no longer co-operate, but this does not matter insofar as coupling is achieved again as soon as the shock absorber is relaxed.

It is nevertheless possible to replace the above system by a small scissors linkage 133 connecting the inner rod 132 to the outer rod 131. This small linkage 133 is shown in chain-dashed lines and comprises two hinged arms 134 and 136 that interconnect the two components of the telescopic sliding rod via associated forks 135 and 137.

The shock absorber also includes a linear actuator which is constituted, in this case, by an electro-hydraulic actuator completely identical to that described above with reference to FIG. 3. There is therefore no need to repeat the description of its component parts and of its operation.

Figure 5:
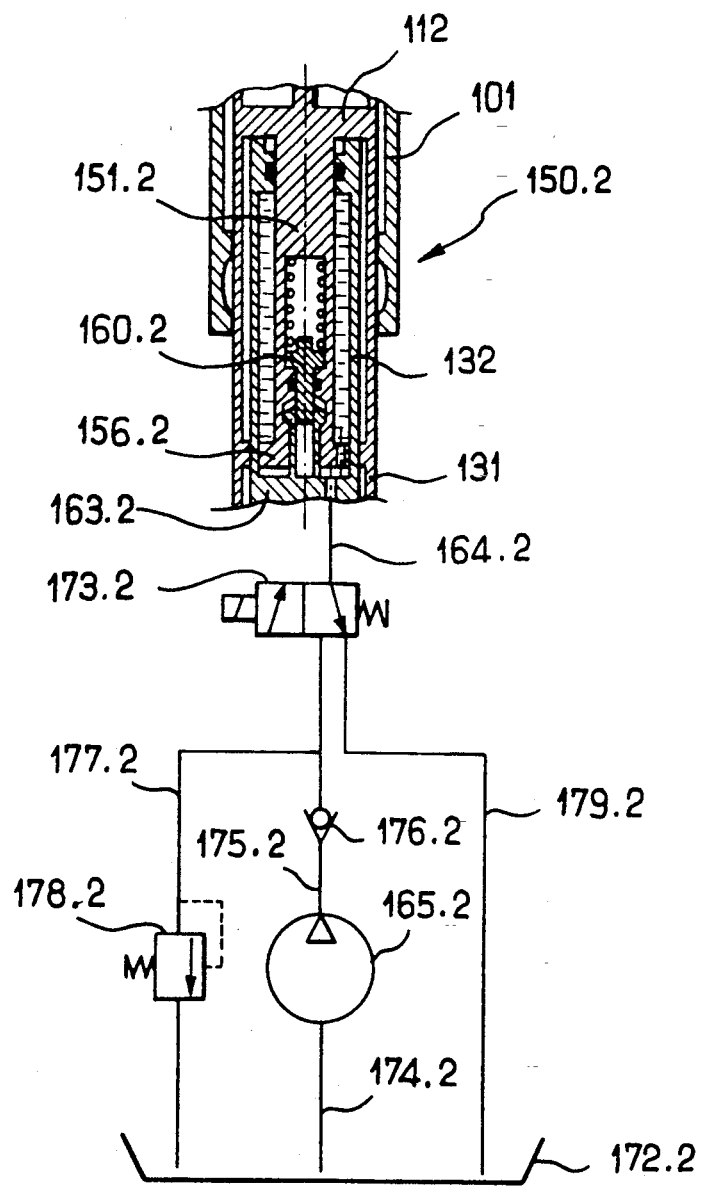
FIG. 5 is a diagram showing the electro-hydraulic members associated with controlling the actuator for raising a shock absorber as shown in FIG. 3 or FIG. 4, said members being received, in the example shown, within the inside rod of the telescopic sliding rod.

The electro-hydraulic members associated with controlling the electrical pump 165.2 are now described, which members are essentially received in the central block 166.2. These electro-hydraulic members are shown diagrammatically in FIG. 5, in which a fragment of the hydraulic actuator 150.2 can be seen.

The connection between the electrical pump 165.2 and the active chamber of the hydraulic actuator is provided by a first line 175.2 including a non-return valve 176.2 and reaching an electrically controlled valve 173.2 downstream from which there is a second line 164.2. The electrical pump 165.2 is connected to the pressurized supply of hydraulic fluid 172.2 via a line 174.2. Hydraulic return is provided by a line 179.2 leading to the pressurized supply 172.2. Independent power generation is finished off by a line 177.2 fitted with an overpressure valve 178.2. In the rest position, the electrically controlled valve 173.2 provides a return to the pressurized supply 172.2, which is the position shown in FIG. 5. When the valve 173.2 is excited, and the electrical pump 165.2 is activated, the pump delivers fluid into the moving rod of the hydraulic actuator, with the valve 178.2 preventing any danger of excess pressure in said feed.

It thus becomes easy to change the attitude of the aircraft merely by controlling the electrically controlled valve 173.2 and by activating the electrical pump 165.2, both of which are associated with the linear actuator. When the landing gear is no longer to be extended, it suffices to de-excite the electrically controlled valve, since on returning to its rest position it allows the system to return automatically to its rest position under drive from the static load on the shock absorber without there being any need to provide a special control for this purpose. Once it has moved down, the shock absorber has returned to the initial position it occupied under static load.

It is thus possible to provide a shock absorber whose structure makes it easy to extend the landing gear when the airplane is stationary or moving slowly on the ground, without requiring the hydraulic power generator of the airplane to be used. The shock absorber is also simple in design and easily controllable extension can be obtained without any danger of disturbance and/or leakage relative to the hydraulic power generation circuits of the airplane.

The invention is not limited to the embodiments described above, but on the contrary extends to any variant using equivalent means to reproduce the essential characteristics specified above.

We claim:

1. A shock absorber for an aircraft landing gear leg, the shock absorber comprising a cylinder and a rod sliding in said cylinder, together with a disk defining a lower hydraulic fluid chamber which communicates via a diaphragm with an upper hydraulic fluid chamber adjacent to a pressurized gas chamber provided in the upper portion of the cylinder, wherein the sliding rod is implemented in telescopic form, having an outer rod sliding in the cylinder, an intermediate partition which constitutes the above-mentioned disk, and an inner rod sliding in the outer rod on the other side of said partition from the lower hydraulic fluid chamber, bearing directly against said partition when the shock absorber is relaxed or under static load, and wherein the shock absorber further includes a linear actuator received inside the inner rod and suitable, when switched on, for extending the landing gear while the airplane is stationary or moving slowly on the ground, and at least one external scissors linkage for conveying the structural twisting forces to which the telescopic sliding rod is subjected.

2. A shock absorber according to claim 1, including independent means for controlling the linear actuator, said Independent means being integrated, at least in part, inside the inner rod.

3. A shock absorber according to claim 1, including two scissors linkages for conveying the structural twisting forces, comprising a lower linkage connecting the inner rod to the outer rod, and an upper linkage connecting the outer rod to a sleeve rotatably mounted on the cylinder.

4. A shock absorber according to claim 1, including a single scissors linkage connecting the inner rod to a sleeve rotatably mounted on the cylinder, together with additional anti-rotation means between the inner rod and the outer rod.

5. A shock absorber according to claim 4, wherein the additional anti-rotation means is integrated, at least in part, inside the outer rod.

6. A shock absorber according to claim 1, wherein the linear actuator is an electro-mechanical actuator having a screw and nut system in which the screw is prevented from moving axially and in which the nut is secured to the intermediate partition.

7. A shock absorber according to claim 6, wherein the nut of the screw and nut system is mounted at the end of a central sleeve secured to the intermediate partition, into which the screw of said screw and nut system penetrates, said nut moving in an upper chamber of the inner rod and co-operating with an internal projection of said inner rod to form an abutment in the maximally extended position, the inner rod also having a lower chamber in which a driving motor and gear box assembly is received, at least in part.

8. A shock absorber according to claim 7, including a single scissors linkage connecting the inner rod to a sleeve rotatably mounted on the cylinder, together with additional anti-rotation means between the inner rod and the outer rod, wherein the additional anti-rotation means is integrated, at least in part, inside the outer rod, and wherein the additional anti-rotation means is constituted by a stud sliding in an associated axial slot, said stud being preferably secured to the nut and penetrating into an axial slot formed in the wall of the inner rod.

9. A shock absorber according to claim 1, wherein the linear actuator is a hydraulic actuator whose rod is secured to the intermediate partition and slides in an upper chamber of the inner rod, said inner rod also having a lower chamber in which an electrical pump and a pressurized supply of hydraulic fluid are provided.

10. A shock absorber according to claim 9, wherein the inner rod includes an intermediate partition delimiting said lower and upper chambers, said partition carrying axial locking means, e.g. mechanical claw means, co-operating with the rod of the hydraulic actuator when the inner rod bears against the intermediate partition of the outer rod, i.e. when the shock absorber is relaxed or under static load.

11. A shock absorber according to claim 10, including a single scissors linkage connecting the inner rod to a sleeve rotatably mounted on the cylinder, together with additional anti-rotation means between the inner rod and the outer rod,.wherein the additional anti-rotation means is integrated, at least in part, inside the outer rod, and wherein the additional anti-rotation means includes corresponding cams of the inner rod and of the intermediate partition of the outer rod, said cams co-operating mutually when the shock absorber is relaxed or under static load.

12. A shock absorber according to claim 10, including a single scissors linkage connecting the inner rod to a sleeve rotatably mounted on the cylinder, together with additional anti-rotation means between the inner rod and the outer rod,.wherein the additional anti-rotation means is integrated, at least in part, inside the outer rod, and wherein the additional anti-rotation means includes a small scissors linkage connecting the inner rod to the outer rod.

* * * * *